US012629777B2

(12) United States Patent　　　　(10) Patent No.:　US 12,629,777 B2
Goya et al.　　　　　　　　　　　　(45) Date of Patent:　　May 19, 2026

(54) LASER CUTTING METHOD AND LASER CUTTING DEVICE

(71) Applicant: MITSUBISHI HEAVY INDUSTRIES, LTD., Tokyo (JP)

(72) Inventors: Saneyuki Goya, Tokyo (JP); Ryuichi Narita, Tokyo (JP); Akiko Inoue, Tokyo (JP); Hiroki Mori, Tokyo (JP); Ryota Ozaki, Tokyo (JP); Masahiko Shimizu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 980 days.

(21) Appl. No.: 17/776,014

(22) PCT Filed: Nov. 15, 2019

(86) PCT No.: PCT/JP2019/044935
§ 371 (c)(1),
(2) Date: May 11, 2022

(87) PCT Pub. No.: WO2021/095253
PCT Pub. Date: May 20, 2021

(65) Prior Publication Data
US 2022/0395930 A1　　Dec. 15, 2022

(51) Int. Cl.
*B23K 26/38*　　　　(2014.01)
*B23K 26/082*　　　(2014.01)

(52) U.S. Cl.
CPC ............ *B23K 26/38* (2013.01); *B23K 26/082* (2015.10)

(58) Field of Classification Search
CPC .... B23K 26/364; B23K 26/082; B23K 26/38; B23K 2103/16
See application file for complete search history.

(56) References Cited

FOREIGN PATENT DOCUMENTS

| JP | 2005279730 A | | 10/2005 |
| JP | 2012071314 A | * | 4/2012 |
| JP | 2015157312 A | * | 9/2015 |

OTHER PUBLICATIONS

International Search Report and Written Opinion of International Application No. PCT/JP2019/044935 mailed Jan. 7, 2020; 10pp.

* cited by examiner

*Primary Examiner* — Thien S Tran
(74) *Attorney, Agent, or Firm* — HAUPTMAN HAM, LLP

(57)　　　　　ABSTRACT

In this laser cutting method and laser cutting device with which a base material is cut by irradiating, with laser, a surface of a base material formed of a composite material, an irradiation step for swinging the laser in a tolerance direction crossing the length direction of a cutting line while moving the laser relative to the base material along the length direction of the cutting line for cutting the base material is repeatedly performed on the cutting line, thereby cutting the base material, and in the irradiation step, a swing width in the width direction of the laser is decreased as the depth in the depth direction from the surface of the base material toward the rear surface increases.

9 Claims, 3 Drawing Sheets

LENGTH
DIRECTION

WIDTH
DIRECTION

LASER CUTTING METHOD AND LASER CUTTING DEVICE

RELATED APPLICATIONS

The present application is a National Phase of International Application Number PCT/JP2019/044935 filed Nov. 15, 2019.

TECHNICAL FIELD

The present disclosure relates to a laser cutting method and a laser cutting device.

BACKGROUND ART

In the related art, as a laser cutting method, a laser cutting method for a composite material is known as follows. The method includes a primary irradiation step of performing a primary cutting process by irradiating a cutting area of the composite material containing a reinforced fiber as a base material with a primary laser beam capable of cutting the reinforced fiber, and a secondary irradiation step of performing a secondary cutting process by irradiating a site irradiated with the primary laser beam with a secondary laser beam capable of cutting the base material (for example, refer to PTL 1). The laser cutting method targets a thin plate workpiece having a thickness of 2 mm. In the primary irradiation step, while the primary laser beam orbits, the primary laser beam is moved along a longitudinal direction of the cutting area. In the secondary irradiation step, the secondary laser beam is moved along the longitudinal direction of the cutting area. The laser cutting method adopted in this way is a method for properly cutting the reinforced fiber and a resin in the composite material. In a case of the thin plate workpiece having the thickness of 2 mm, the composite material can be cut by performing the above-described two steps.

CITATION LIST

Patent Literature

[PTL 1] Japanese Unexamined Patent Application Publication No. 2015-157312

SUMMARY OF INVENTION

Technical Problem

Incidentally, according to the laser cutting method disclosed in PTL 1, since a laser processing target is a thin plate, the reinforced fiber and the resin in the composite material can be properly cut by performing the above-described two steps. However, in a case where the laser processing target is a thick plate, when the same primary irradiation step and the same secondary irradiation step are performed on the composite material forming the thick plate, an irradiation time is lengthened. At a position where a cutting depth increases, heat generated by laser irradiation enters the position, and spreads in a width direction. Therefore, a shape and quality of a cut surface deteriorate. In addition, cutting the reinforced fiber in the primary irradiation step and cutting the base material in the secondary irradiation step are separately performed. Consequently, a processing time for cutting the composite material is lengthened.

Therefore, an object of the present disclosure is to provide a laser cutting method and a laser cutting device which can improve efficiency in cutting a composite material.

Solution to Problem

According to the present disclosure, there is provided a laser cutting method of cutting a base material formed of a composite material by irradiating a surface of the base material with a laser. The laser cutting method includes cutting the base material by repeatedly performing an irradiation step so that a cutting line is irradiated with the laser oscillating in an intersecting direction intersecting a length direction of the cutting line, while relatively moving the laser with respect to the base material along the length direction of the cutting line for cutting the base material. In the irradiation step, an oscillation width of the laser in the intersecting direction is reduced as a depth in a depth direction is deepened from the surface toward a rear surface of the base material.

In addition, according to the present disclosure, there is provided a laser cutting device that cuts a base material formed of a composite material by irradiating a surface of the base material with a laser. The laser cutting device includes a laser irradiation unit that irradiates the base material with the laser, a laser scanner that scans the base material with the laser, a moving unit that relatively moves the laser with respect to the base material along a length direction of a cutting line for cutting the base material, and a control unit that controls operations of the laser irradiation unit, the laser scanner, and the moving unit. The control unit cuts the base material by repeatedly performing an irradiation step so that the cutting line is irradiated with the laser oscillating in an intersecting direction intersecting the length direction of the cutting line, while relatively moving the laser with respect to the base material along the length direction of the cutting line. In the irradiation step, an oscillation width of the laser in the intersecting direction is reduced as a depth in a depth direction is deepened from the surface toward a rear surface of the base material.

Advantageous Effects of Invention

According to the present disclosure, it is possible to improve efficiency in cutting the composite material.

DESCRIPTION OF EMBODIMENTS

Hereinafter, embodiments according to the present disclosure will be described in detail with reference to the drawings. The present invention is not limited by the embodiments. In addition, configuration elements in the following embodiments include those which can be easily replaced by those skilled in the art, or those which are substantially the same. In addition, the configuration elements described below can be appropriately combined with each other, and when there are a plurality of the embodiments, the embodiments can be combined with each other.

Embodiment 1

Figure 1:
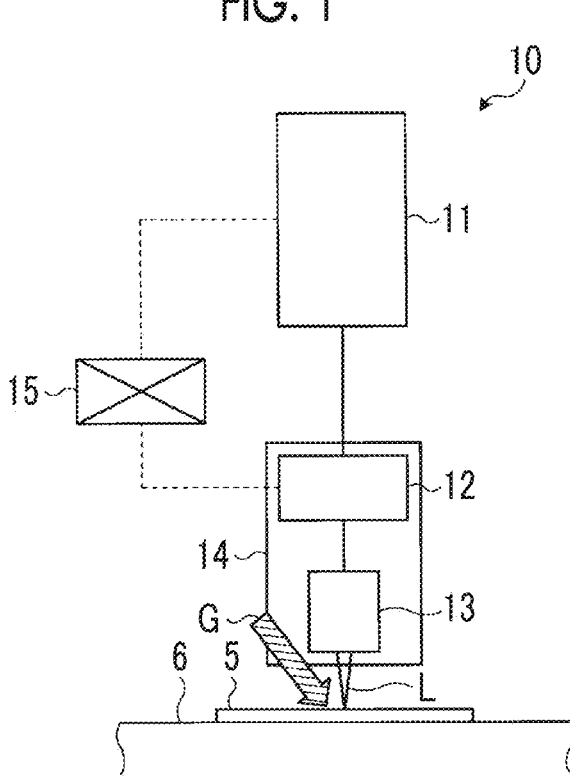
FIG. 1 is a view schematically illustrating a laser cutting device according to Embodiment 1.

FIG. 1 is a view schematically illustrating a laser cutting device according to Embodiment 1. As illustrated in FIG. 1, a laser cutting device 10 according to Embodiment 1 is a device that can cut a composite material 5 forming a base material by irradiating the composite material 5 with a laser L.

(Composite Material)

The composite material 5 contains a reinforced fiber and a resin, and is fiber reinforced plastics such as carbon fiber reinforced plastic (CFRP), glass fiber reinforced plastic (GFRP), carbon fiber reinforced thermoplastic (CFRPT), glass long fiber reinforced plastic (GMT), and Cu-mesh (copper mesh), for example.

(Laser Cutting Device)

As illustrated in FIG. 1, the laser cutting device 10 includes a support base 6, a laser irradiation device (laser irradiation unit) 11, a scanning optical system (laser scanner) 12, a light condensing optical system 13, and a moving unit 14, a control unit 15, and a gas nozzle.

The support base 6 supports the composite material 5 at a predetermined position. The support base 6 may be a moving stage for moving the composite material 5 within a horizontal plane. A surface of the composite material 5 disposed in the support base 6 is substantially vertically irradiated with the laser L emitted from the laser irradiation device 11.

The laser irradiation device 11 is a device that outputs the laser L. The laser irradiation device 11 may use a pulse wave (continuous wave) or a continuous wave (CW) as the laser L to be output. In Embodiment 1, it is preferable to use the laser irradiation device 11 that irradiates the composite material 5 with the laser L having the continuous wave capable of continuously supplying energy. In addition, the laser irradiation device 11 may irradiate the composite material 5 with the laser L in a single mode or a multi-mode. In Embodiment 1, it is preferable to use the laser irradiation device 11 that irradiates the composite material 5 with the laser L in a single mode having a high light condensing property.

The scanning optical system 12 is an optical system that scans the composite material 5 with the laser L emitted from the laser irradiation device 11. The scanning optical system 12 includes a scanner capable of operating the laser inside the surface of the composite material 5. For example, as the scanner, a galvanometer mirror is used. As the scanner used in the embodiment, a prism rotator or a tip tilt mirror can be used in addition to the galvanometer mirror.

The light condensing optical system 13 is an optical system that condenses the laser L emitted from the scanning optical system 12 at a focus, and irradiates the composite material 5 with the condensed laser L. The light condensing optical system 13 is configured to include an optical member such as a light condensing lens.

The moving unit 14 is a moving mechanism that moves the laser L with respect to the composite material 5. For example, the moving unit 14 integrally moves the scanning optical system 12 and the light condensing optical system 13. The moving unit 14 moves the laser L along a cutting line I for cutting the composite material 5.

The gas nozzle supplies an assist gas G to an irradiation position of the laser L emitted from the laser irradiation device 11. As the assist gas G, a rare gas such as nitrogen or argon, or air is applied.

The control unit 15 is connected to each unit including the laser irradiation device 11, the scanning optical system 12, the light condensing optical system 13, and the moving unit 14, and controls an operation of the laser cutting device 10 by controlling each unit. For example, the control unit 15 adjusts irradiation conditions of the laser L emitted from the laser irradiation device 11 by controlling the laser irradiation device 11. In addition, the control unit 15 controls a scanning operation of the laser L on the surface of the composite material 5 by controlling the scanning optical system 12. In addition, the control unit 15 adjusts a focal position of the laser L by controlling the light condensing optical system 13. In addition, the control unit 15 controls a movement of the laser L with respect to the composite material 5 by controlling the moving unit 14.

The laser cutting device 10 configured as described above irradiates the composite material 5 with the laser L emitted from the laser irradiation device 11, and guides the laser L emitted to the scanning optical system 12. The laser cutting device 10 changes an irradiation position of the laser L on the surface of the composite material 5 by scanning the surface of the composite material 5 with the laser L incident on the scanning optical system 12. The laser cutting device 10 causes the laser L emitted from the scanning optical system 12 to be incident on the light condensing optical system 13, and irradiates the composite material 5 with the condensed laser L. The laser cutting device 10 moves the laser L along the cutting line I by controlling the moving unit 14.

(Laser Cutting Method)

Figure 2:
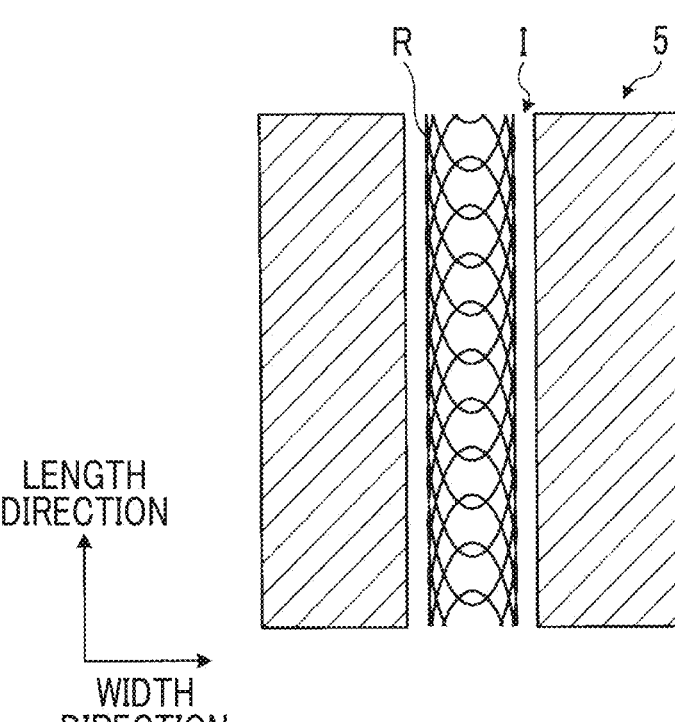
FIG. 2 is a view when an oscillating laser is viewed from an upper surface.
Figure 3:
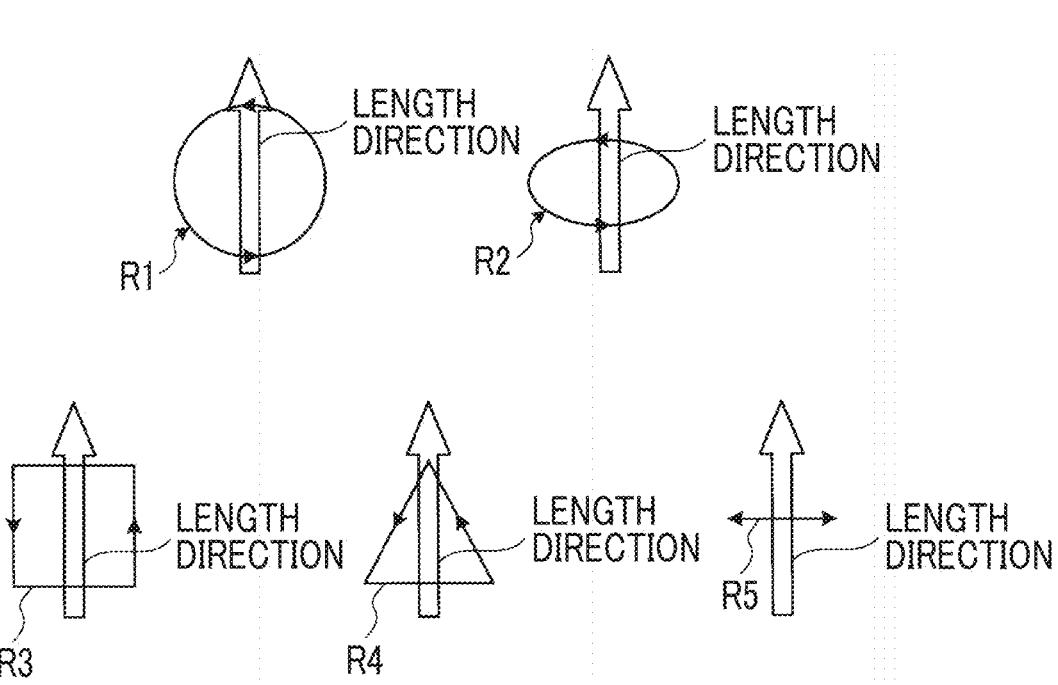
FIG. 3 is a view illustrating a trajectory of the oscillating laser.
Figure 4:
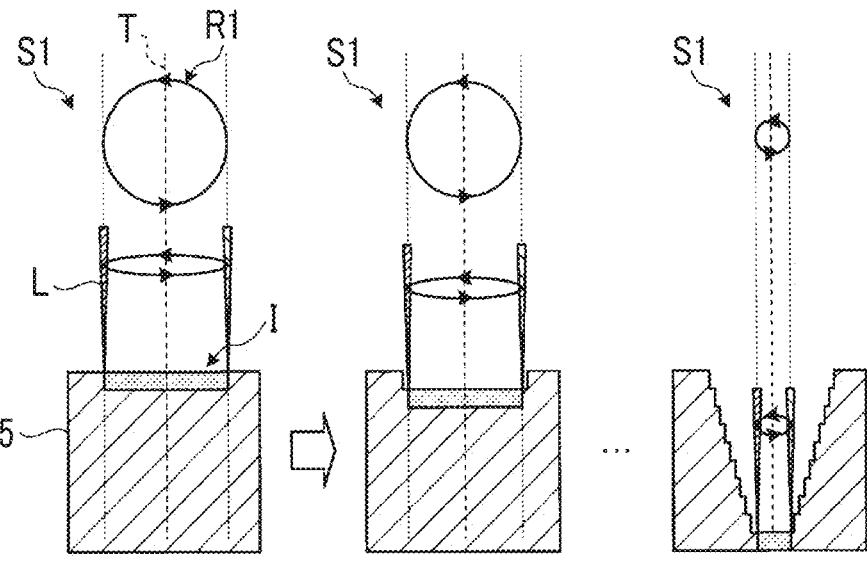
FIG. 4 is a view for describing a laser cutting method according to Embodiment 1.

Next, a laser cutting method of cutting the composite material 5 by using the above-described laser cutting device 10 will be described with reference to FIG. 2. FIG. 2 is a view when an oscillating laser is viewed from an upper surface. FIG. 3 is a view illustrating a trajectory of the oscillating laser. FIG. 4 is a view for describing a laser cutting method according to Embodiment 1. Here, for example, a plate thickness of the composite material 5 is thicker than 2 mm in a thickness direction in which the surface and a rear surface face each other. As the plate thickness increases (to 100 mm), a cutting effect according to the embodiment increases. In particular, it is preferable that the plate thickness is 4 mm or thicker, and is more preferably 10 mm or thicker.

In the laser cutting method according to Embodiment 1, the composite material 5 is cut while the laser L oscillates. The laser L oscillates at least in a width direction (intersecting direction) intersecting a length direction of the cutting line I. That is, the laser L may be used for scanning that oscillates along the length direction and the width direction of the cutting line I, or may be used for scanning that oscillates along the width direction of the cutting line I. The oscillating laser L is used for the scanning so that the laser L draws a predetermined trajectory R with respect to the surface of the composite material 5.

As illustrated in FIG. 3, for example, the scanning that oscillates in the length direction and the width direction of the cutting line I includes scanning that draws an orbit trajectory R1 orbiting in a circular shape on the surface of the composite material 5, scanning that draws an orbit trajectory R2 orbiting in an elliptical shape, scanning that draws an orbit trajectory R3 orbiting in a rectangular shape, and scanning that draws an orbit trajectory R4 orbiting in a triangular shape. In addition, for example, the scanning that oscillates along the width direction of the cutting line I includes scanning that draws a linearly oscillating trajectory R5 on the surface of the composite material 5. Alternatively, a fan shape, a polygonal shape, and a shape obtained by combining the above-described shapes are applicable. An oscillation width in the width direction of the respective trajectories R1 to R5 illustrated in FIG. 3 has a length substantially the same as the length in the width direction of the cutting line I. Then, the laser cutting device 10 cuts the composite material 5 by moving the laser L that draws the trajectories R1 to R5 illustrated in FIG. 3 along the cutting line I. In the laser L, a scanning speed in the above-described orbit trajectories R1 to R4 is higher than a scanning speed in the length direction of the cutting line I.

In addition, in the laser cutting method of Embodiment 1, irradiation conditions of the laser L, that is, cutting conditions for cutting the composite material 5 are as follows. A laser output of the laser L emitted from the laser irradiation device 11 is a high-power laser whose laser output is higher than 0.2 kW and is equal to or lower than 500 kW. In addition, as a wavelength of the laser L, for example, a wavelength in a 1 μm band, a wavelength in which green is visible light, a wavelength in which blue is visible light, and a wavelength in which ultraviolet light are applicable. A frequency of the oscillation of the laser L in the width direction falls within a range of 10 Hz to 10,000 Hz. A moving speed of the cutting line I in the length direction, that is, a cutting speed preferably falls within a range of 1 to 1000 m/min. In addition, it is desirable that the scanning speed of the laser L in the above-described orbit trajectories R1 to R4 is higher than the scanning speed of the cutting line I in the length direction. The scanning speed in the orbit trajectories R1 to R4 of the laser L is preferably higher than 1 m/min, and is more preferably equal to or higher than 100 m/min.

A laser cutting method of cutting the composite material 5 will be described with reference to FIG. 4. In FIG. 4, a case will be described where the scanning of the laser L is scanning that draws the orbit trajectory R1 orbiting in a circular shape in FIG. 3. An upward-downward direction in FIG. 4 is a thickness direction of the composite material 5. The width direction of the cutting line I is a rightward-leftward direction in FIG. 4, and the length direction is a depth direction in FIG. 4. In addition, the cutting line I is preset with respect to the composite material 5, and the laser L is moved along the length direction of the preset cutting line I.

In the laser cutting method, the composite material 5 is cut by repeatedly performing an irradiation step S1 of irradiating the cutting line I with the laser L, on the cutting line I. In the irradiation step S1, the laser L moves along the length direction of the cutting line I while the scanning that draws the orbit trajectory R1 is performed by the laser L oscillating in the width direction and the length direction of the cutting line I. One layer of the composite material 5 is removed by moving the cutting line I in a longitudinal direction.

In addition, in the repeated irradiation step S1, the oscillation width in the width direction of the laser L is reduced as a depth in the depth direction is deepened from the surface toward the rear surface of the composite material 5. That is, the oscillation width in the width direction of the laser L in the subsequent irradiation step S1 is smaller than the oscillation width in the width direction of the laser L in the current irradiation step S1. In this case, the irradiation step S1 is repeatedly performed in a state where a center T of the laser L in the width direction in the oscillation width is aligned with a center of the cutting line I in the width direction. A removal amount of the composite material 5 for one layer removed by irradiating the composite material 5 with the laser L in the subsequent irradiation step S1 may be the same as a removal amount of the composite material 5 for one layer removed by irradiating the composite material 5 with the laser L in the current irradiation step S1.

In addition, in the irradiation step S1, a focus O of the laser L in the current irradiation step S1 is aligned with a formation surface formed in the previous irradiation step S1 to irradiate the formation surface with the laser L. That is, a position of the focus O of the laser L in the current irradiation step S1 is a deeper position in the depth direction than a position of the focus O of the laser L in the previous irradiation step S1. The irradiation conditions of the laser L in the irradiation step S1 performed multiple times are the same irradiation conditions.

The irradiation step S1 is repeatedly performed so that a cutting groove formed by removing the composite material 5 has a shape illustrated in FIG. 4. That is, in a cross section cut by a plane orthogonal to the length direction of the cutting line I, the cutting groove has a tapered shape tapered from the surface to the rear surface of the composite material 5.

As described above, according to Embodiment 1, the irradiation step S1 of irradiating the cutting line I with the laser L oscillating in the width direction can be repeatedly performed. Therefore, it is not necessary to divide the irradiation step S1 into a plurality of irradiation steps using different lasers L. Accordingly, the composite material 5 can be efficiently cut. In addition, the composite material 5 for one layer can be removed by using the one-pass laser L. Accordingly, the efficiency in the cutting process in the irradiation step S1 can be improved. Furthermore, the laser cutting method can be performed by using the single laser irradiation device 11. Accordingly, a device configuration of the laser cutting device 10 can be simplified.

In addition, according to Embodiment 1, the composite material 5 can be irradiated with the laser L to draw the orbit trajectories R1 to R4 on the composite material 5. Therefore, the composite material 5 for one layer in the cutting line I can be removed while suppressing a possibility that the composite material 5 may be partially left behind.

In addition, according to Embodiment 1, the orbit trajectories R1 to R4 can have various shapes. Accordingly, the composite material 5 can be preferably cut by selecting the shapes of the orbit trajectories R1 to R4 depending on a laser cutting mode.

In addition, according to Embodiment 1, the irradiation step S1 can be repeatedly performed in a state where a center T of the laser L in the width direction in the oscillation width is aligned with a center of the cutting line I in the width direction. Therefore, the composite material 5 can be cut by repeatedly performing the irradiation step S1 without changing the center T of the laser L in the oscillation width.

In addition, according to Embodiment 1, the high-power laser whose laser output is higher than 0.2 kW and is equal to or lower than 500 kW can be used. Accordingly, the reinforced fiber and the resin which are contained in the composite material 5 can be properly cut.

In addition, according to Embodiment 1, the composite material 5 forming the thick plate thicker than 2 mm can be properly cut.

In Embodiment 1, the irradiation conditions of the laser L in the irradiation step S1 performed multiple times are the same conditions. However, the irradiation conditions may be changed for each irradiation step S1. That is, the irradiation conditions such as the laser output of the laser L, the wavelength of the laser L, the frequency of the oscillation of the laser L in the width direction, and the cutting speed of the cutting line I in the length direction may be changed for each irradiation step S1.

Embodiment 2

Figure 5:
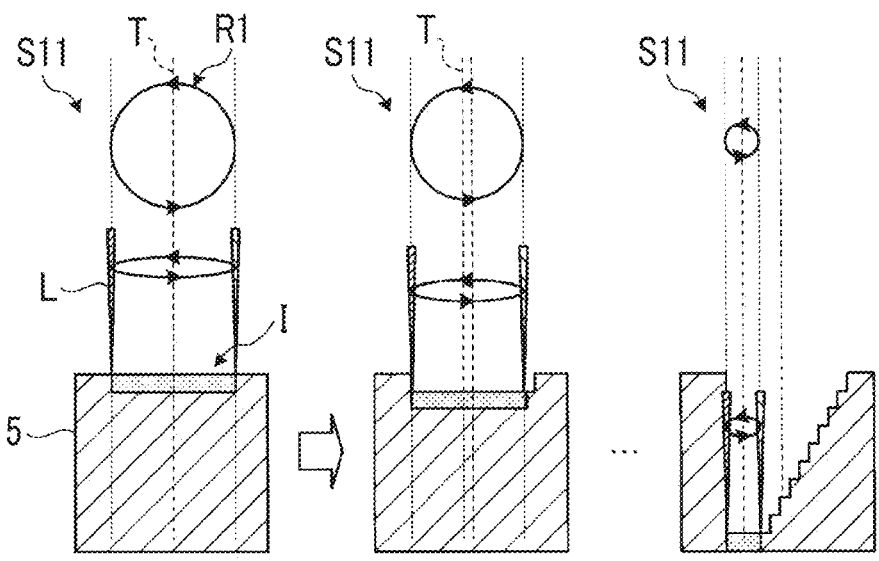
FIG. 5 is a view for describing a laser cutting method according to Embodiment 2.

Next, a laser cutting device and a laser cutting method according to Embodiment 2 will be described with reference to FIG. 5. In Embodiment 2, in order to avoid repeated description, elements different from those in Embodiment 1 will be described, and description will be made by assigning the same reference numerals to elements having configurations the same as those in Embodiment 1. FIG. 5 is a view for describing the laser cutting method according to Embodiment 2.

In the laser cutting method of Embodiment 2, the irradiation step S11 is repeatedly performed in a state where one end portion (left side in FIG. 5) of the laser L in the width direction in the oscillation width is aligned with one end portion of the cutting line I in the width direction. That is, in the current irradiation step S11, compared to the previous irradiation step S11, the center T in the oscillation width of the laser L is moved to one end portion side in the oscillation width of the laser L so that one end portion side in the oscillation width of the laser L serves as a reference.

The irradiation step S11 is repeatedly performed so that the cutting groove formed by removing the composite material 5 has a shape illustrated in FIG. 5. That is, in a cross section cut by a plane orthogonal to the length direction of the cutting line I, in the cutting groove, a cutting surface in one end portion of the laser L in the oscillation width can become a vertical surface extending along the thickness direction of the composite material 5. On the other hand, a cutting surface in the other end portion of the laser L in the oscillation width becomes an inclined surface inclined with respect to the thickness direction.

As described above, according to Embodiment 2, the irradiation step S11 can be repeatedly performed in a state where one end portion of the laser L in the oscillation width is aligned with one end portion of the cutting line I in the width direction. Therefore, an end surface of the cut composite material 5 can be the vertical surface. Accordingly, the cutting process can be more accurately performed. The composite material 5 that becomes the vertical surface after the cutting can be used as a product, and the composite material 5 that becomes the inclined surface after the cutting can be used as a remaining portion.

Figure 6:
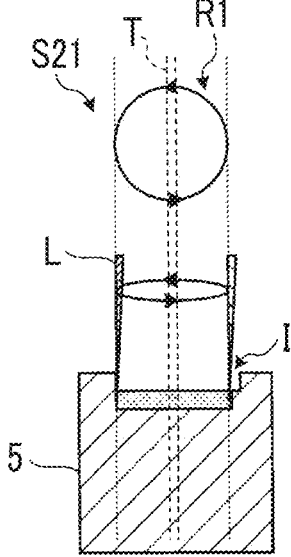
FIG. 6 is a view for describing a laser cutting method according to a modification example of Embodiment 2.

In Embodiment 2, the irradiation direction of the laser L is not particularly limited. However, the irradiation direction may be set as illustrated in FIG. 6. FIG. 6 is a view for describing the laser cutting method according to a modification example of Embodiment 2. In the laser cutting method of the modification example, in the irradiation step S21, the laser L is relatively inclined with respect to the composite material 5. Specifically, in the laser cutting method of Embodiment 2, the laser L is inclined with respect to the thickness direction of the composite material 5 in a cross section in FIG. 6 which is orthogonal to the length direction of the cutting line I.

As illustrated in FIG. 6, the laser L is inclined so that an outside of the laser L before being condensed on the focus O in one end portion (left side in FIG. 6) of the cutting line I follows the thickness direction of the composite material 5. Therefore, in the cutting groove, the cutting surface in one end portion of the laser L in the oscillation width can be an accurate vertical surface extending along the thickness direction of the composite material 5.

As described above, according to the modification example of Embodiment 2, the irradiation direction of the laser L is inclined with respect to the cutting line I. In this manner, the cutting surface after the tip in one end portion of the cutting line I can be the accurate vertical surface extending along the thickness direction of the composite material 5.

The laser cutting methods and the laser cutting devices 10 which are described in the respective embodiments can be understood as follows, for example.

According to a first aspect, there is provided the laser cutting method of cutting the base material (composite material 5) by irradiating the surface of the base material formed of the composite material 5 with the laser L. In the laser cutting method, while the laser L is relatively moved with respect to the base material along the length direction of the cutting line I for cutting the base material, the base material is cut by repeatedly performing the irradiation steps S1, S11, and S21 on the cutting line I so that the cutting line I is irradiated with the laser L oscillating in the intersecting direction (width direction) intersecting the length direction of the cutting line I. In the irradiation step, the oscillation width of the laser L in the width direction is reduced as the depth in the depth direction is deepened from the surface toward the rear surface of the base material.

According to this configuration, the irradiation step S1 can be repeatedly performed by irradiating the cutting line I with the laser L oscillating in the width direction. Therefore, it is not necessary to divide the irradiation step S1 into a plurality of irradiation steps using different lasers L. Accordingly, the cutting process of the base material (composite material 5) can be efficiently performed. In addition, the composite material 5 for one layer can be removed by using the one-pass laser L. Accordingly, the efficiency in the cutting process in the irradiation step S1 can be improved. Furthermore, the laser cutting method can be performed by using the single laser irradiation device 11. Accordingly, a device configuration of the laser cutting device 10 can be simplified.

In the laser cutting method according to a second aspect, in the irradiation steps S1, S11, and S21, the laser L oscillates in the intersecting direction (width direction) and the length direction of the cutting line I. In this manner, the base material is irradiated with the laser L to draw the orbit trajectories R1 to R4 of the laser L orbiting on the base material.

According to this configuration, the composite material 5 can be irradiated with the laser L to draw the orbit trajectories R1 to R4 on the base material (composite material 5). Therefore, the composite material 5 for one layer in the cutting line I can be removed while suppressing a possibility that the composite material 5 may be partially left behind.

In the laser cutting method according to a third aspect, the scanning speed of the laser L in the orbit trajectories R1 to R4 is higher than the scanning speed of the cutting line I in the length direction.

According to this configuration, the scanning speed of the laser L in the orbit trajectories R1 to R4 can be higher. Therefore, heat entering the base material (composite material 5) can be suppressed.

In the laser cutting method according to a fourth aspect, the orbit trajectories R1 to R4 have any shape of a circular shape, an elliptical shape, a fan shape, a rectangular shape, a triangular shape, or a polygonal shape, or a shape obtained by combining any shape thereof.

According to this configuration, the orbit trajectories R1 to R4 can have various shapes. Therefore, the composite material 5 can be preferably cut by selecting the shapes of the orbit trajectories R1 to R4 depending on a laser cutting mode.

In the laser cutting method according to a fifth aspect, the irradiation step S1 is repeatedly performed in a state where the center T of the laser L in the width direction in the oscillation width is aligned with the center of the cutting line I in the width direction.

According to this configuration, the irradiation step S1 can be repeatedly performed in a state where the center T of the laser L in the width direction in the oscillation width is aligned with the center of the cutting line I in the width direction. Therefore, the composite material 5 can be cut by repeatedly performing the irradiation step S1 without changing the center T of the laser L in the oscillation width.

In the laser cutting method according to a sixth aspect, the irradiation steps S11 and S21 are repeatedly performed in a state where one end portion of the laser L in the width direction in the oscillation width is aligned with one end portion of the cutting line I in the width direction.

According to this configuration, the irradiation step S11 can be repeatedly performed in a state where one end portion of the laser L in the oscillation width is aligned with one end portion of the cutting line I in the width direction. Therefore, an end surface of the cut composite material 5 can be the vertical surface. Accordingly, the cutting process can be more accurately performed.

In the laser cutting method according to a seventh aspect, the laser is the high-power laser whose laser output is higher than 0.2 kW and is equal to or lower than 500 kW.

According to this configuration, the high-power laser whose laser output is higher than 0.2 kW and is equal to or lower than 500 kW can be used. Therefore, the reinforced fiber and the resin which are contained in the composite material 5 can be properly cut.

In the laser cutting method according to an eighth aspect, the thickness of the base material is thicker than 2 mm.

According to this configuration, it is possible to properly cut the base material (composite material 5) forming the thick plate thicker than 2 mm, particularly the thick plate having the thickness of 4 mm or thicker, and furthermore, the thick plate having the thickness of 10 mm or thicker.

According to a ninth aspect, there is provided the laser cutting device 10 that cuts the base material (composite material 5) by irradiating the surface of the base material formed of the composite material with the laser L. The laser cutting device 10 includes the laser irradiation unit (laser irradiation device 11) that irradiates the base material with the laser L, the laser scanner (scanning optical system 12) that scans the base material with the laser L, the moving unit 14 that relatively moves the laser L with respect to the base material along the length direction of the cutting line I for cutting the base material, and the control unit 15 that controls the operations of the laser irradiation unit, the laser scanner, and the moving unit 14. The control unit 15 cuts the base material by repeatedly performing the irradiation steps S1, S11, and S21 so that the cutting line I is irradiated with the laser L oscillating in the intersecting direction (width direction) intersecting the length direction of the cutting line I, while relatively moving the laser L with respect to the base material along the length direction of the cutting line I. In the irradiation steps S1, S11, and S21, the oscillation width of the laser L in the width direction is reduced as the depth in the depth direction is deepened from the surface toward the rear surface of the base material.

According to this configuration, the irradiation step S1 can be repeatedly performed by irradiating the cutting line I with the laser L oscillating in the width direction. Therefore, it is not necessary to divide the irradiation step S1 into a plurality of irradiation steps using different lasers L. Accordingly, the cutting process of the base material (composite material 5) can be efficiently performed. In addition, the composite material 5 for one layer can be removed by using the one-pass laser L. Accordingly, the efficiency in the cutting process in the irradiation step S1 can be improved. Furthermore, the laser cutting method can be performed by using the single laser irradiation device 11. Accordingly, a device configuration of the laser cutting device 10 can be simplified.

The laser cutting device 10 according to a tenth aspect further includes the gas nozzle that supplies the assist gas toward the irradiation position of the laser L emitted from the laser irradiation unit (laser irradiation device 11). The gas nozzle may be coaxial with the laser, or may have a separate axis.

According to this configuration, the assist gas can be supplied toward the irradiation position of the laser L. Therefore, it is possible to suppress heat entering the base material (composite material 5) which is generated by the laser irradiation.

REFERENCE SIGNS LIST

5: Composite material
6: Support base
10: Laser cutting device
11: Laser irradiation device
12: Scanning optical system
13: Light condensing optical system
14: Moving unit
15: Control unit
L: Laser
I: Cutting line
R1 to R5: Trajectory
O: Focus

The invention claimed is:

1. A laser cutting method of cutting a base material formed of a composite material by irradiating a surface of the base material with a laser, the method comprising:
cutting the base material by repeatedly performing an irradiation step so that a cutting line is irradiated with the laser oscillating in an intersecting direction intersecting a length direction of the cutting line, while relatively moving the laser with respect to the base material along the length direction of the cutting line for cutting the base material,
wherein in the irradiation step, an oscillation width of the laser in the intersecting direction is reduced as a depth in a depth direction is deepened from the surface toward a rear surface of the base material, and
the irradiation step is repeatedly performed in a state where one end portion in the oscillation width of the laser in a width direction is aligned with one end portion of the cutting line in the width direction, and involves tilting a rotational center axis of the laser as a depth in a depth direction is deepened from the surface toward a rear surface of the base material.

2. The laser cutting method according to claim 1,
wherein in the irradiation step, the laser oscillates in the intersecting direction and the length direction of the cutting line so that the base material is irradiated with the laser to draw an orbit trajectory in which the laser orbits on the base material.

3. The laser cutting method according to claim 2, wherein a scanning speed of the laser in the orbit trajectory is higher than a scanning speed in the length direction of the cutting line.

4. The laser cutting method according to claim 2, wherein the orbit trajectory is any shape of a circular shape, an elliptical shape, a fan shape, a rectangular shape, a triangular shape, and a polygonal shape, or a shape obtained by combining any of these shapes.

5. The laser cutting method according to claim 1, wherein the irradiation step is repeatedly performed in a state where a center in the oscillation width of the laser in a width direction is aligned with a center of the cutting line in the width direction.

6. The laser cutting method according to claim 1, wherein the laser is a high-power laser whose laser output is higher than 0.2 kW and is equal to or lower than 500 kW.

7. The laser cutting method according to claim 1, wherein a thickness of the base material is thicker than 2 mm.

8. A laser cutting device that cuts a base material formed of a composite material by irradiating a surface of the base material with a laser, the device comprising:

a laser irradiation unit that irradiates the base material with the laser;

a laser scanner that scans the base material with the laser;

a moving unit that relatively moves the laser with respect to the base material along a length direction of a cutting line for cutting the base material; and a control unit that controls operations of the laser irradiation unit, the laser scanner, and the moving unit, wherein the control unit cuts the base material by repeatedly performing an irradiation step so that the cutting line is irradiated with the laser oscillating in an intersecting direction intersecting the length direction of the cutting line, while relatively moving the laser with respect to the base material along the length direction of the cutting line, and in the irradiation step, an oscillation width of the laser in the intersecting direction is reduced as a depth in a depth direction is deepened from the surface toward a rear surface of the base material, and the irradiation step is repeatedly performed in a state where one end portion in the oscillation width of the laser in a width direction is aligned with one end portion of the cutting line in the width direction, and involves tilting a rotational center axis of the laser as a depth in a depth direction is deepened from the surface toward a rear surface of the base material.

9. The laser cutting device according to claim 8, further comprising:

a gas nozzle that supplies an assist gas toward an irradiation position of the laser emitted from the laser irradiation unit.

* * * * *